No. 761,043. PATENTED MAY 24, 1904.
W. T. GEORGE.
PLOW.
APPLICATION FILED AUG. 8, 1903.
NO MODEL.
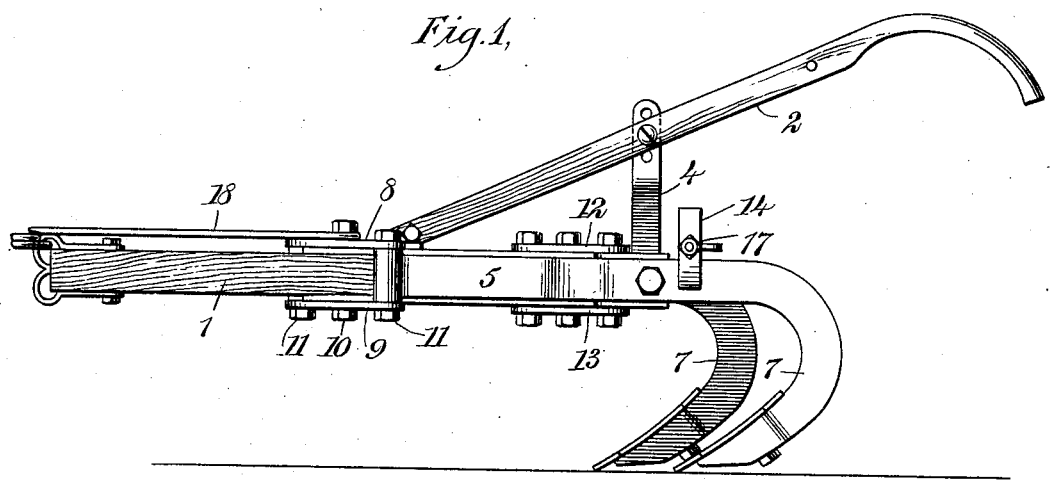
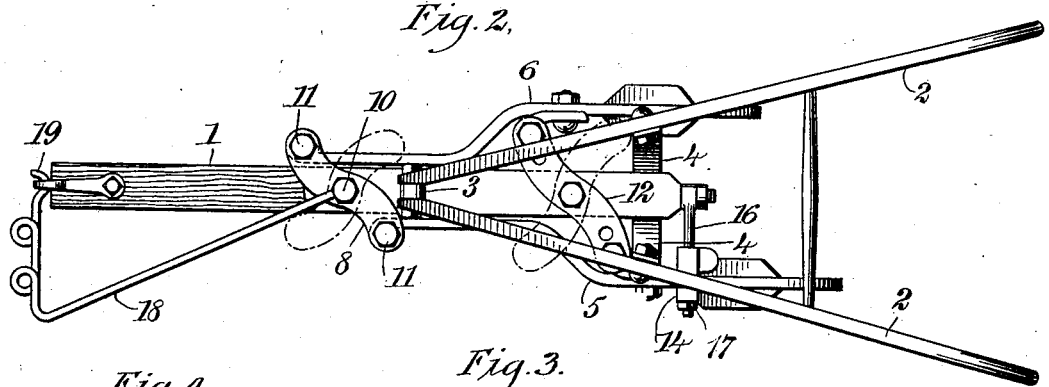
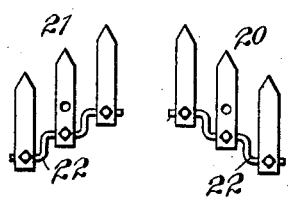
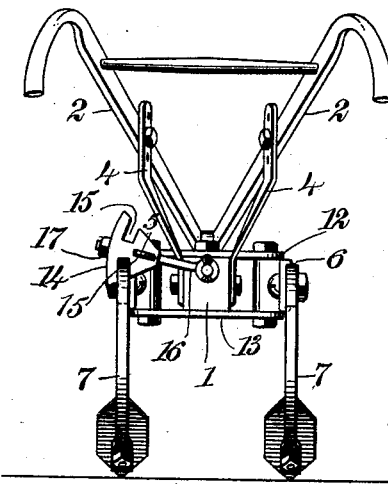
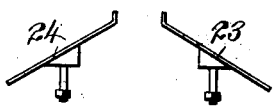
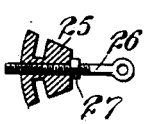
WITNESSES:
Edward Thorpe
C. R. Ferguson
INVENTOR
William T. George
BY
[signature]
ATTORNEYS No. 761,043.

Patented May 24, 1904.

UNITED STATES PATENT OFFICE.

WILLIAM T. GEORGE, OF FAYETTEVILLE, TENNESSEE, ASSIGNOR OF ONE-THIRD TO TILLMAN J. LAMB, OF FAYETTEVILLE, TENNESSEE.

PLOW.

SPECIFICATION forming part of Letters Patent No. 761,043, dated May 24, 1904.

Application filed August 8, 1903. Serial No. 168,773. (No model.)

*To all whom it may concern:*

Be it known that I, WILLIAM T. GEORGE, a citizen of the United States, and a resident of Fayetteville, in the county of Lincoln and State of Tennessee, have invented a new and Improved Plow, of which the following is a full, clear, and exact description.

This invention relates to improvements in reversible double-shovel plows, an object being to provide a plow of this character so arranged that changes can be quickly made to place either shovel in advance of the other while plowing on a side hill, so that the dirt will be thrown in the same direction in both furrows.

Other objects of the invention will appear in the general description.

I will describe a plow embodying my invention and then point out the novel features in the appended claims.

Reference is to be had to the accompanying drawings, forming a part of this specification, in which similar characters of reference indicate corresponding parts in all the figures.

Figure 1 is a side elevation of a plow embodying my invention. Fig. 2 is a plan view thereof. Fig. 3 is a rear elevation. Fig. 4 is a plan view of harrow-teeth that may be employed. Fig. 5 indicates a cotton-scraper that may be employed, and Fig. 6 shows a modified form of locking device.

Referring to the drawings, 1 designates the plow-beam, which may be either of wood or of metal, and attached to the beam are the handles 2. As here shown, these handles at their forward ends have swinging connection with a lug 3, attached to the beam, and between their ends the handles are adjustable on standards 4, attached to the beam.

Mounted to swing laterally with relation to the beam and also to move lengthwise thereof are the shovel or implement carrying bars 5 6, the rear ends 7 of which are turned downward, and to these downwardly-turned ends the shovels or other implements are secured. Extended across the plow-beam at the top and bottom are swinging bars 8 9, these bars being arranged to swing on a pivot 10, and between the outer ends of these bars 8 9 the shovel-carrying bars are pivoted. As here shown, the ends of the shovel-carrying bars swing on bolts 11. Also pivoted to the beam near the rear end are swinging bars 12 13, and the shovel-carrying bars have pivotal connection with said bars 12 13. By this arrangement the two shovel-carrying bars may be swung so as to place one shovel in advance of the other, or they may be arranged so that the shovels are directly opposite each other. The bars 12 13 are provided with a plurality of holes through which the pivot-bolts may pass, so that the distance between the shovels may be adjusted as desired.

As a means for locking the bars as adjusted I employ a locking device consisting of a block 14, provided with opposite notches 15, designed to receive the bars—that is, when the block is swung in one direction the bar 5 will engage in a notch and when swung in the other direction the bar 6 may be engaged in the other notch. This block is mounted on a rod 16, having swinging connection with the rear end of the plow-beam. The block is preferably adjustable lengthwise of the rod, so that it may be regulated for the space between the shovel-carrying bars, and to hold it as adjusted I employ a nut 17, which engages with the threaded portion of the rod.

When the shovels are placed directly opposite each other, which is necessary in cultivating corn or the like—that is, for cultivating both sides of a row straddled by the plow—the block may be removed. In cultivating young corn or the like it is obvious that the horse must walk between rows. Therefore I provide a draft-rod 18, which at its rear end is connected to the beam, and from this connection the rod is inclined outward and then has an inwardly-turned portion provided with a hook 19 for engaging with the clevis on the plow-beam. The rod is also provided with eyes, to either one of which the singletree may be attached.

In Fig. 4 I have shown harrow-teeth that may be employed instead of the shovels under certain conditions. The teeth are arranged in two set or series 20 21, spaced apart, and the teeth of each set are secured to a cranked rod 22, so that the teeth stand in echelon.

In Fig. 5 cotton-scrapers 23 24 are shown with means for securing them to the carrying-bars.

In Fig. 6 the notched locking-block 25 has an interior screw-thread engaging with the thread on a rod 26. By this construction the block may be quickly adjusted and held as adjusted by a jam-nut 27.

Having thus described my invention, I claim as new and desire to secure by Letters Patent—

1. A plow comprising a beam, bars on opposite sides of the beam and having movements lengthwise and laterally with relation to the beam, a rod mounted to swing in a vertical plane on the rear end of the beam, and a block adjustable on said rod and adapted to engage with either one of said bars to hold the two bars as adjusted.

2. A plow comprising a beam, shovel-carrying bars arranged on opposite sides thereof and having swinging motion lengthwise of the beam, a rod having swinging connection with the beam, and a block on said rod, the said block having opposite notches whereby it may be removably engaged with either one of the bars.

3. A plow comprising a beam, shovel-carrying bars having longitudinal swinging connection with said beam, a rod mounted to swing on the rear end of the beam, and a block adjustable on said rod, the said block being provided with notches for engaging over the bars.

In testimony whereof I have signed my name to this specification in the presence of two subscribing witnesses.

WILLIAM T. GEORGE.

Witnesses:
B. E. HOLMAN,
J. W. HOLMAN.